US012559189B2

(12) United States Patent (10) Patent No.: US 12,559,189 B2

Desyr (45) Date of Patent: Feb. 24, 2026

---

(54) MOTORCYCLE CANOPY

(71) Applicant: Garry Desyr, Merrick, NY (US)

(72) Inventor: Garry Desyr, Merrick, NY (US)

( * ) Notice: Subject to any disclaimer, the term of this patent is extended or adjusted under 35 U.S.C. 154(b) by 338 days.

(21) Appl. No.: 17/866,664

(22) Filed: Jul. 18, 2022

(65) Prior Publication Data

US 2024/0017784 A1     Jan. 18, 2024

(51) Int. Cl.
B62J 17/086     (2020.01)
B60J 7/10     (2006.01)

(52) U.S. Cl.
CPC .............. B62J 17/086 (2020.02); B60J 7/10 (2013.01)

(58) Field of Classification Search
CPC ........ B62J 17/08; B62J 17/086; B62J 17/083; B60J 7/10; B60J 11/02; B60J 11/04; E04H 15/06
USPC .......... 296/136.1, 136.11, 107.01, 108, 77.1, 296/78.1; 135/88.04, 88.13
See application file for complete search history.

(56) References Cited

U.S. PATENT DOCUMENTS

| | | | |
|---|---|---|---|
| 1,254,858 A | 1/1918 | Shmelstein | |
| 1,342,987 A | 6/1920 | Mike | |
| 1,357,239 A | 11/1920 | Josef | |
| 1,853,742 A | 4/1932 | Leander et al. | |
| 3,256,034 A | 6/1966 | Condray | |
| 3,284,130 A | 11/1966 | Michael | |
| 4,346,725 A | 8/1982 | Shaw | |

| | | | |
|---|---|---|---|
| 4,560,196 A | 12/1985 | Carter | |
| 4,778,214 A | 10/1988 | Fu | |
| 4,950,017 A | 8/1990 | Norton | |
| 5,458,390 A | 10/1995 | Gilbert | |
| 5,791,718 A | 8/1998 | Boutin | |
| 5,842,732 A | 12/1998 | Daggett et al. | |
| 5,975,614 A | 11/1999 | Grue | |
| 6,010,173 A | 1/2000 | Chyan-Luen | |
| 6,227,557 B1 * | 5/2001 | Perret ..................... | B62J 17/08 |
| | | | 296/213 |
| 6,402,220 B2 | 6/2002 | Allen | |
| 6,543,830 B1 | 4/2003 | Stuck | |
| 6,565,139 B2 | 5/2003 | Bayerle et al. | |
| 7,690,390 B2 | 4/2010 | Hopkins et al. | |

(Continued)

FOREIGN PATENT DOCUMENTS

| | | | |
|---|---|---|---|
| CN | 2818291 Y | * | 9/2006 |
| GB | 2096955 A | | 10/1982 |

(Continued)

*Primary Examiner* — Amy R Weisberg
*Assistant Examiner* — Denise Lynne Esquivel
(74) *Attorney, Agent, or Firm* — Boudwin Intellectual Property Law, LLC

(57)     ABSTRACT

A motorcycle canopy. The motorcycle canopy includes a main bar securable to a rear portion of a motorcycle. A pair of telescopic rear bars, each pivotally affixed to the main bar, are configured to rotate between a parallel stored position and a perpendicular deployed position. A flexible side panel is disposed within each rear bar, wherein each side panel is configured to move between a retracted stored position within the rear bar and an extended deployed position out of a slot disposed on each rear bar. A top cover is configured to removably secure to the handlebars of the motorcycle when the top cover is in a deployed configuration, providing an enclosure to protect the motorcycle rider from inclement weather.

2 Claims, 25 Drawing Sheets

(56) References Cited

U.S. PATENT DOCUMENTS

| 2003/0041890 | A1 |   | 3/2003 | Wilson |  |
| 2015/0083174 | A1 | * | 3/2015 | Desyr ...................... | B62J 17/08 |
|  |  |  |  |  | 135/88.13 |
| 2018/0072164 | A1 | * | 3/2018 | Plesniak ................ | B60L 53/00 |

FOREIGN PATENT DOCUMENTS

| KR | 200441063 | Y1 | * | 7/2008 |
| KR | 102104368 | B1 | * | 4/2020 |

* cited by examiner

MOTORCYCLE CANOPY

BACKGROUND OF THE INVENTION

The present invention relates to a motorcycle canopy. More specifically, the present invention provides a motorcycle canopy that includes a plurality of frame members securable to a rear portion of a motorcycle, such that a cover assembly including a top and rear panel, a pair of side panels, and a front panel can be selectively deployed and extended therefrom, forming an enclosure to protect the motorcycle rider from inclement weather.

Many individuals ride motorcycles as a form of transportation for recreational or other purposes. One of the drawbacks of riding a motorcycle is that the rider is typically uncovered and therefore exposed to the surrounding environment. In the event of a sudden rainstorm or other inclement weather, the rider often has to pull over or seek shelter until the inclement weather clears, which can be inconvenient and time consuming. For example, riders often have to seek refuge under an overpass or other covered structures that are available at short notice. Unfortunately, these shelter options may not be located in safe or desirable areas. It can also take a long time to find an appropriate shelter from the weather, during which time the rider is still exposed to the inclement weather.

The rider may choose to continue riding through the inclement weather rather than seeking shelter, which can result in ruined clothing and other uncomfortable distractions. These distractions can increase the risk of an accident and potentially endanger the rider. Some riders utilize full face helmets that include transparent visors, which provide some protection from rain and other inclement weather. However, this protection does not extend to the rider's clothing, which can become waterlogged and damaged if the weather is particularly bad. Some riders utilize water resistant riding clothing, but such clothing is typically very expensive and not entirely effective at keeping the rider completely dry. In view of the above concerns, it is desirable to provide a motorcycle canopy that can be selectively deployed to protect the rider from inclement weather, while providing visibility to the rider.

Devices have been disclosed in the art that relate to motorcycle covers. However, these devices have several known drawbacks. Motorcycle covers in the art typically relate to covers that protect the motorcycle itself from inclement weather, but not the rider. Further, the devices in the art fail to provide a motorcycle cover including a bracket that secures the assembly to a rear portion of a motorcycle, a pair of side panels, a top and back cover, and a front panel that can be selectively deployed to form an enclosure for protecting the motorcycle rider from inclement weather.

In light of the devices disclosed in the art, it is submitted that the present invention substantially diverges in design elements from the devices disclosed in the art, and consequently it is clear that there is a need in the art for an improvement to existing motorcycle covering devices. In this regard the present invention substantially fulfills these needs.

SUMMARY OF THE INVENTION

In view of the foregoing disadvantages inherent in the known types of motorcycle covers and enclosures now present in the art, the present invention provides a motorcycle canopy wherein the same can be utilized for providing convenience for the user when riding a motorcycle during inclement weather.

The motorcycle canopy includes a main bar configured to be secured to a rear portion of a motorcycle, a pair of rear bars pivotally affixed to the main bar, the pair of rear bars configured to rotate between a parallel orientation and a perpendicular orientation with respect to the orientation of the main bar, and a side panel disposed within an interior portion of each rear bar, wherein each side panel is configured to move between a retracted position within the rear bar and an extended position extending upwardly out of the rear bar. A top cover is attachable to the main bar, the top cover comprising a flexible cover member configured to removably secure to the handlebars of the motorcycle when the top cover is in a deployed configuration.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
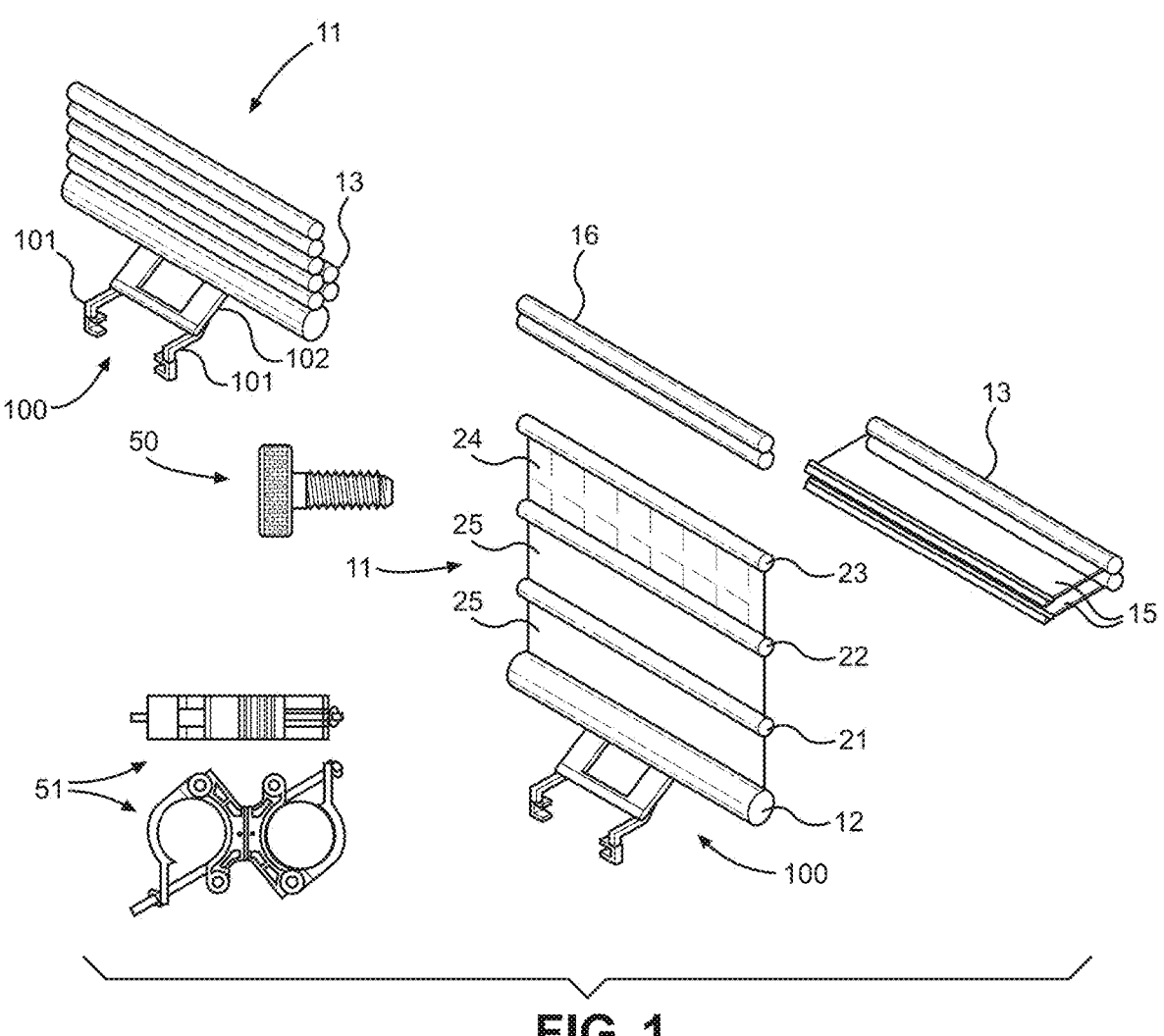
FIG. 1 shows an exploded parts view of the motorcycle canopy.
Figure 2:
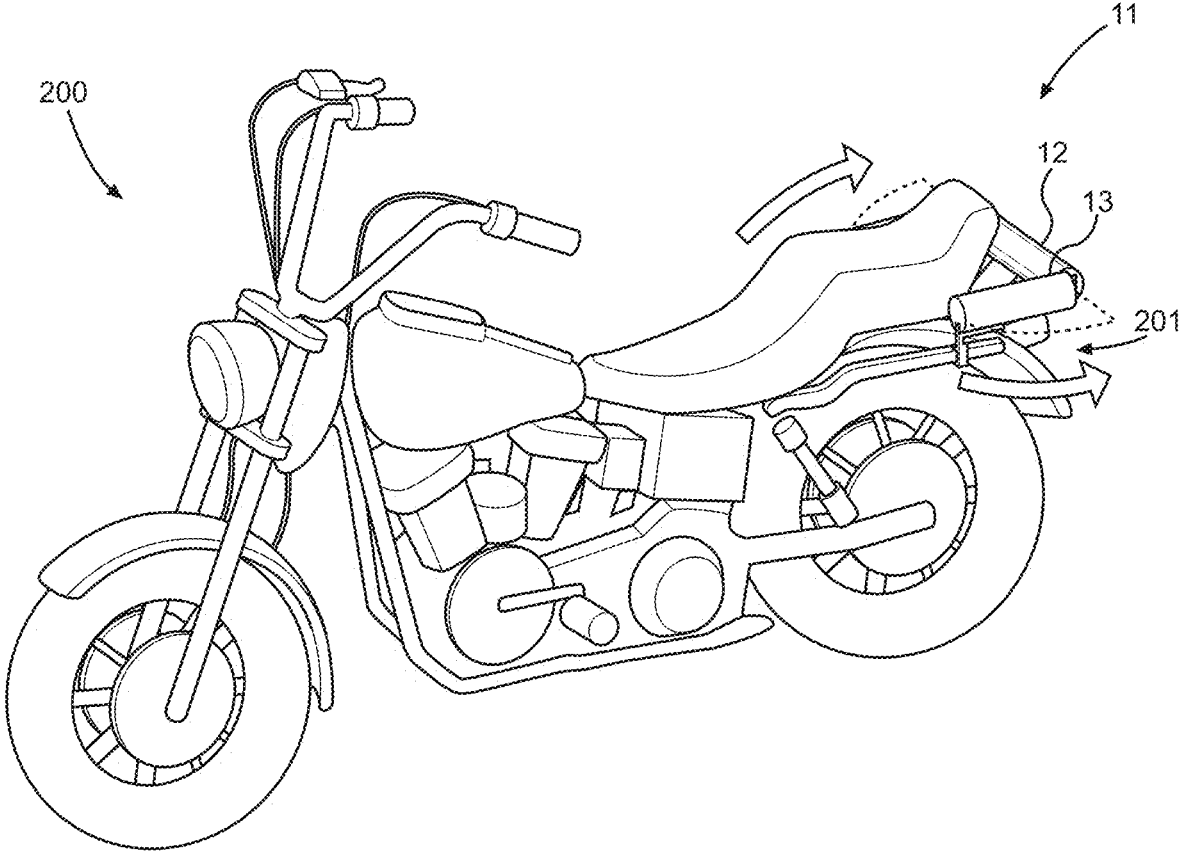
FIG. 2 shows a perspective view of the motorcycle canopy attached to a motorcycle in a stored configuration.
Figure 3:
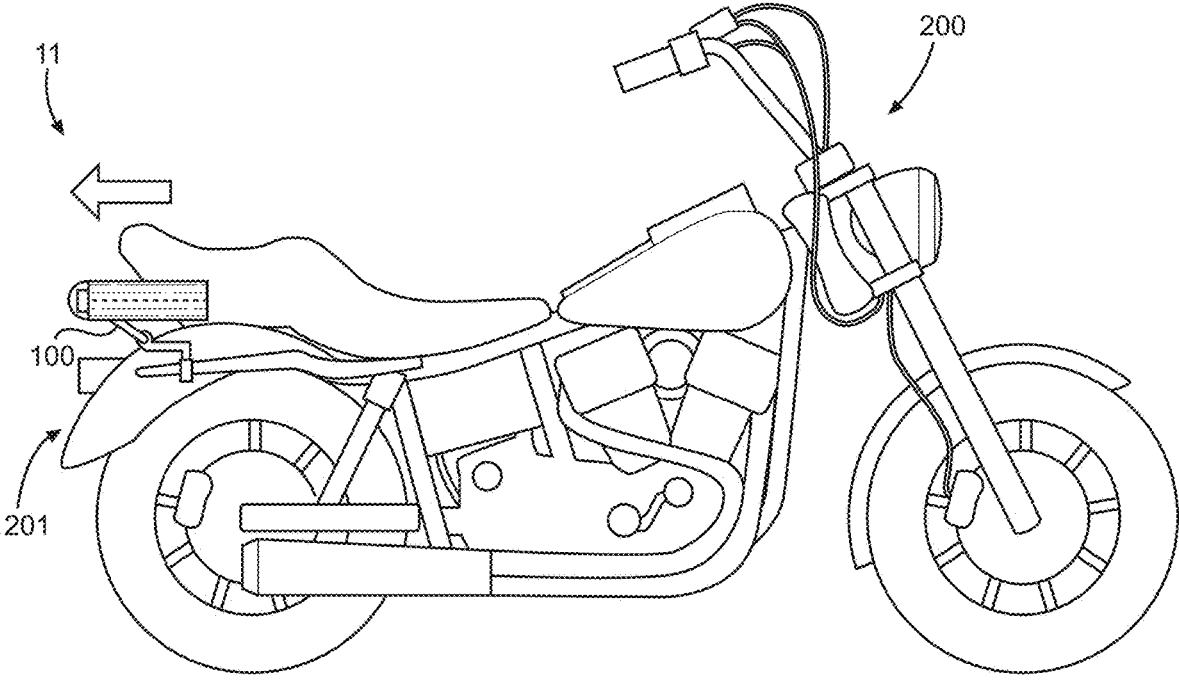
FIG. 3 shows a side view of the motorcycle canopy attached to a motorcycle in a stored configuration.
Figure 4:
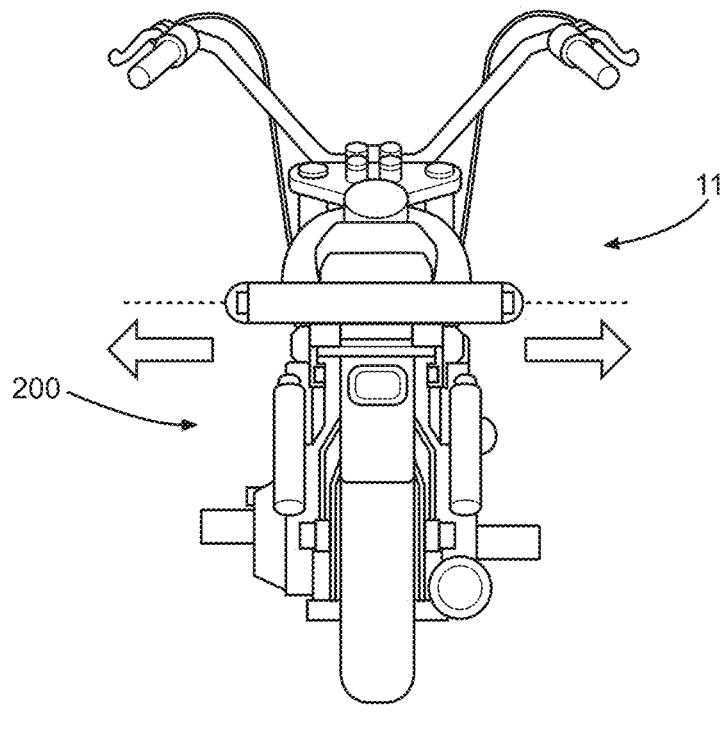
FIG. 4 shows a rear view of the motorcycle canopy attached to a motorcycle in a stored configuration.
Figure 5:
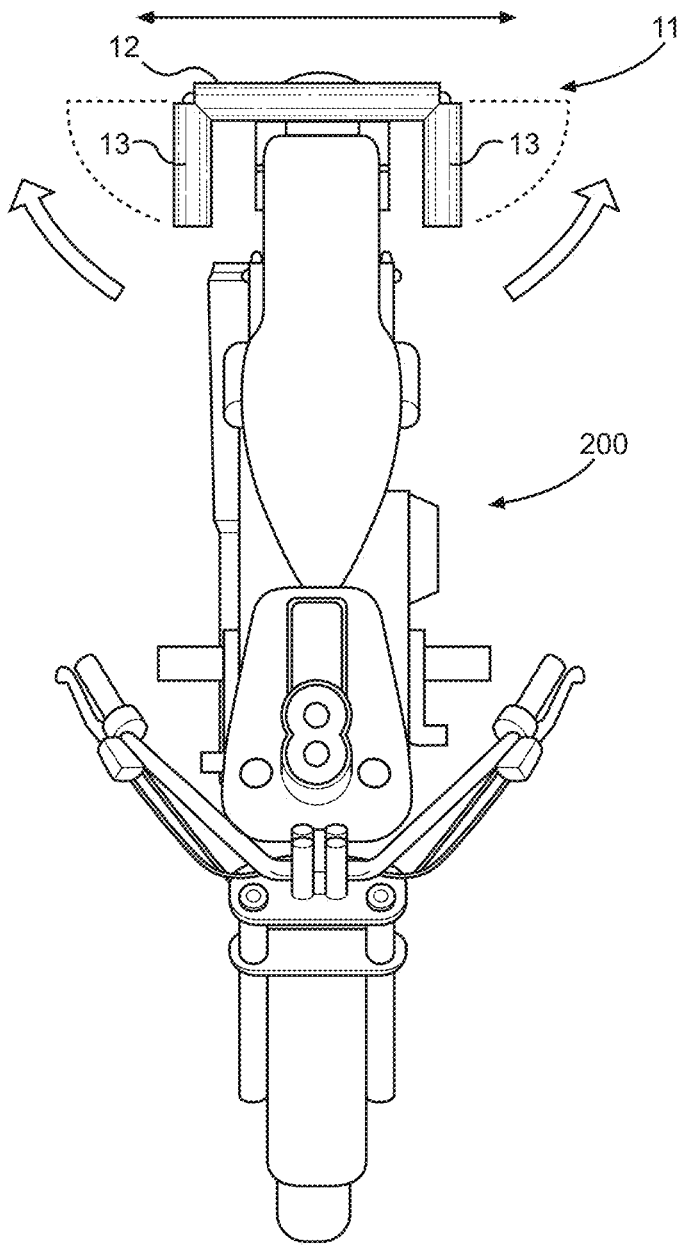
FIG. 5 shows an overhead view of the motorcycle canopy attached to a motorcycle in a stored configuration.
Figure 6:
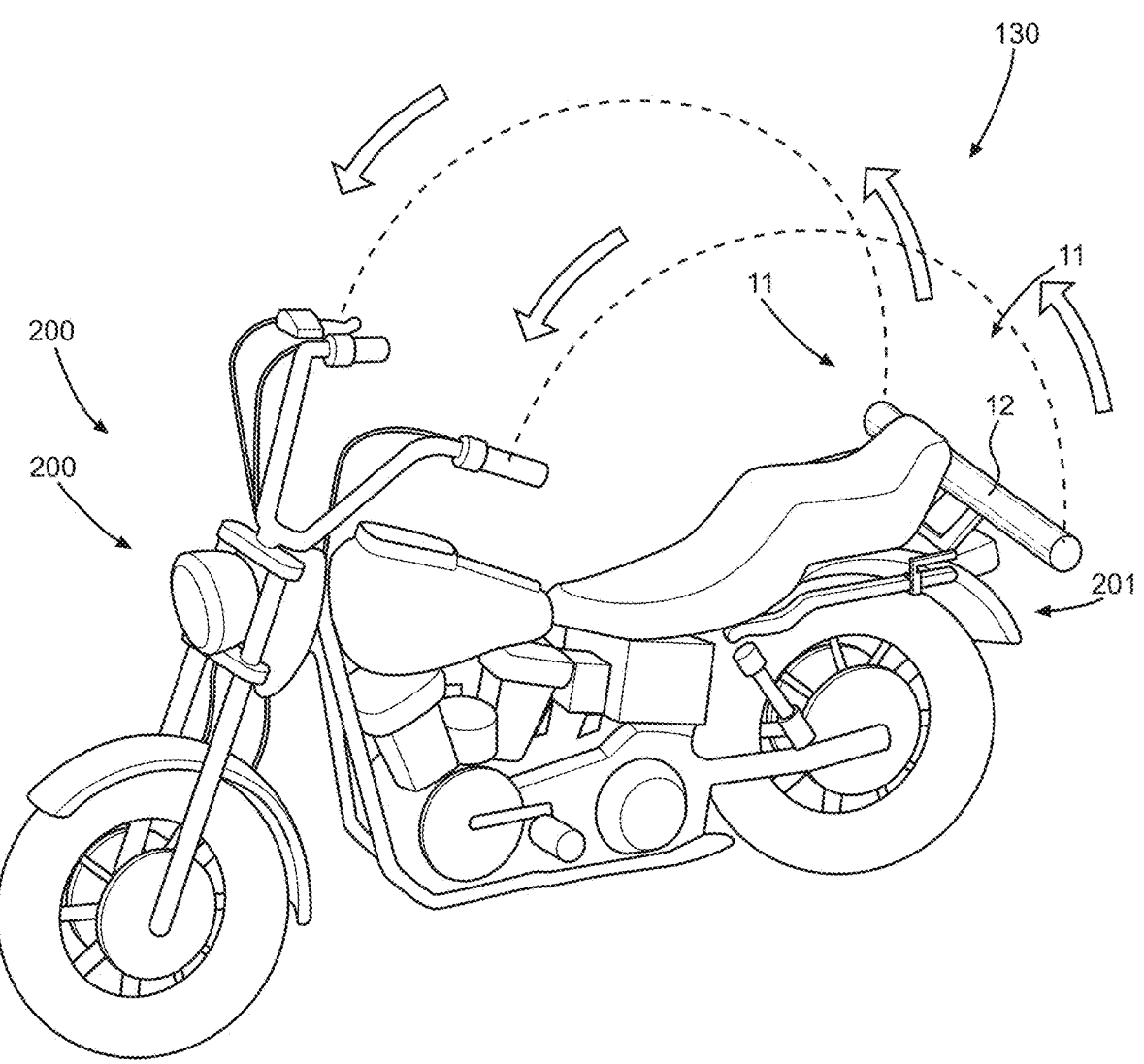
FIG. 6 shows a perspective view of the motorcycle canopy with the rear bars pivoted to an operating position.
Figure 7:
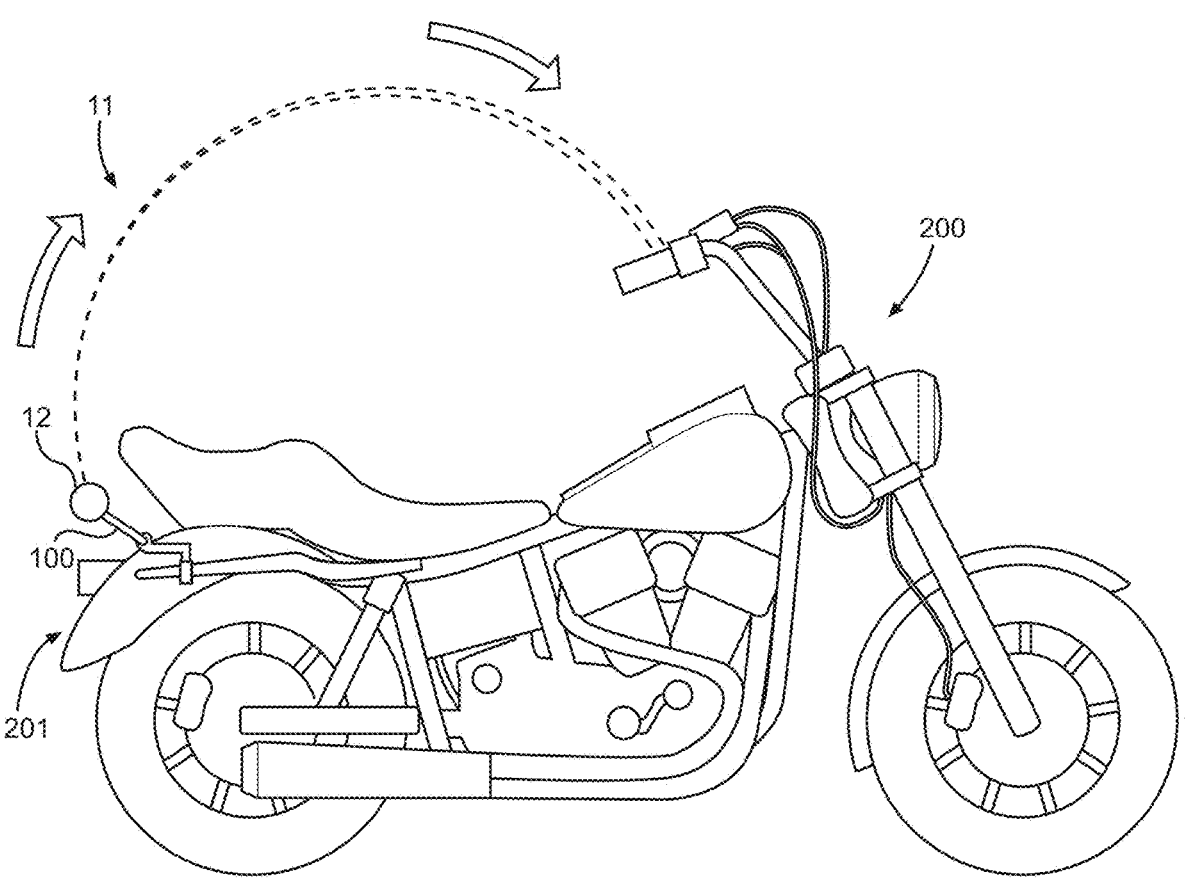
FIG. 7 shows a side view of the motorcycle canopy with the rear bars pivoted to an operating position.
Figure 8:
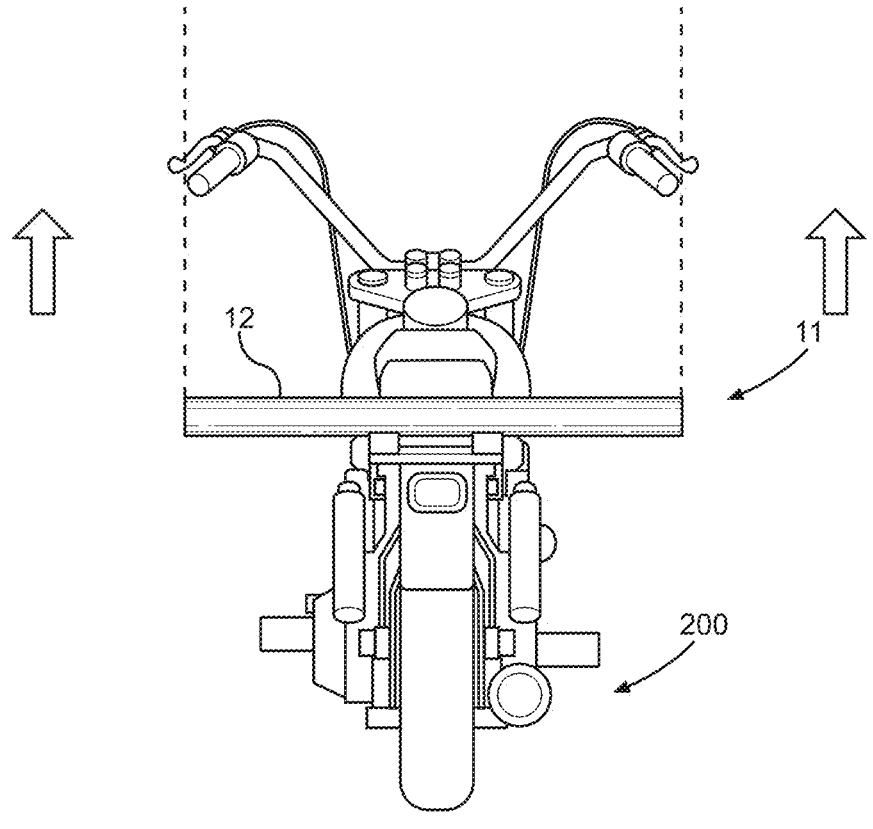
FIG. 8 shows a rear view of the motorcycle canopy with the rear bars pivoted to an operating position.
Figure 9:
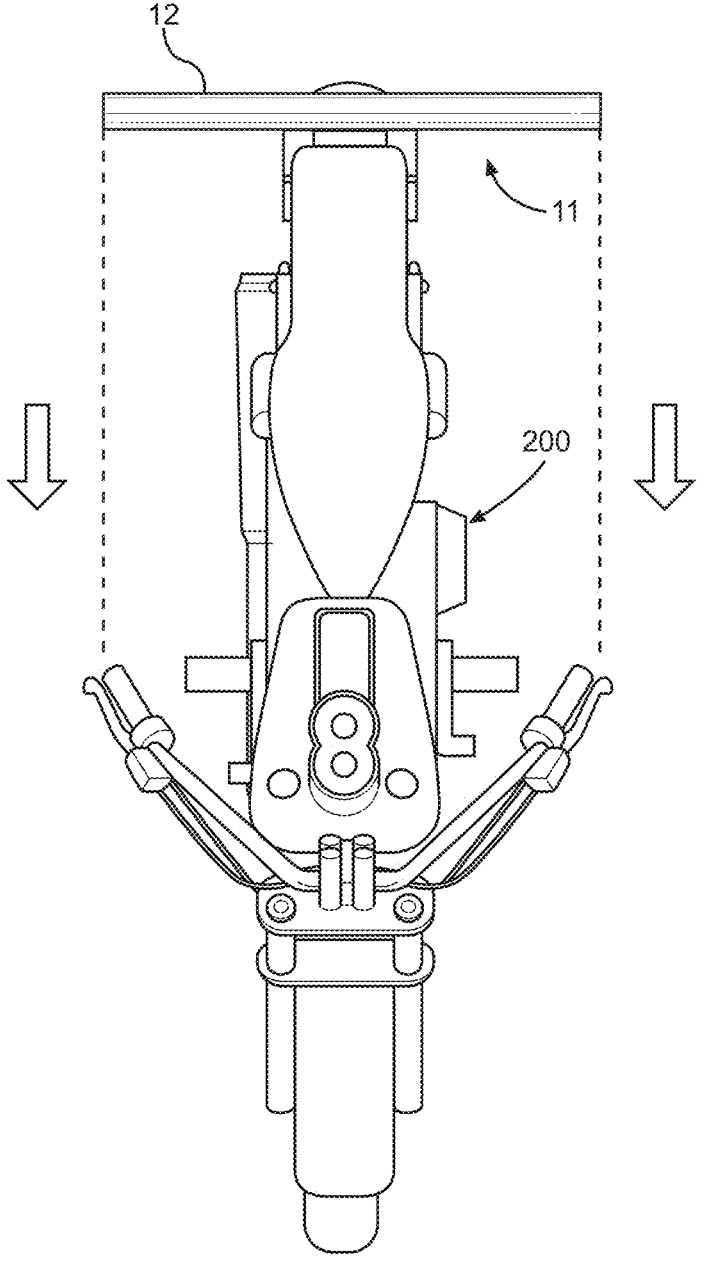
FIG. 9 shows an overhead view of the motorcycle canopy with the rear bars pivoted to an operating position.
Figure 10:
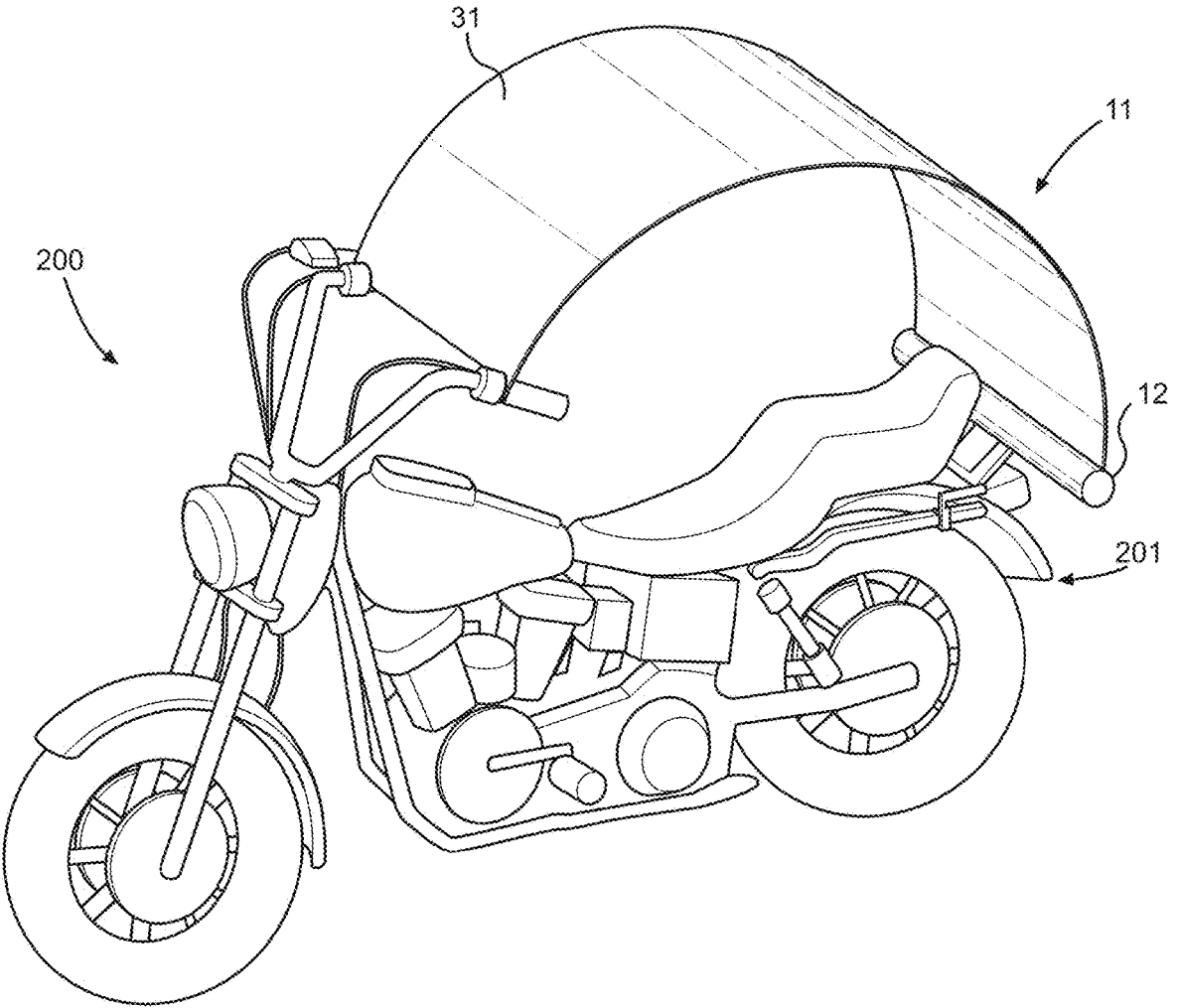
FIG. 10 shows a perspective view of the motorcycle canopy with the side panels being extended toward the installed front bars.
Figure 11:
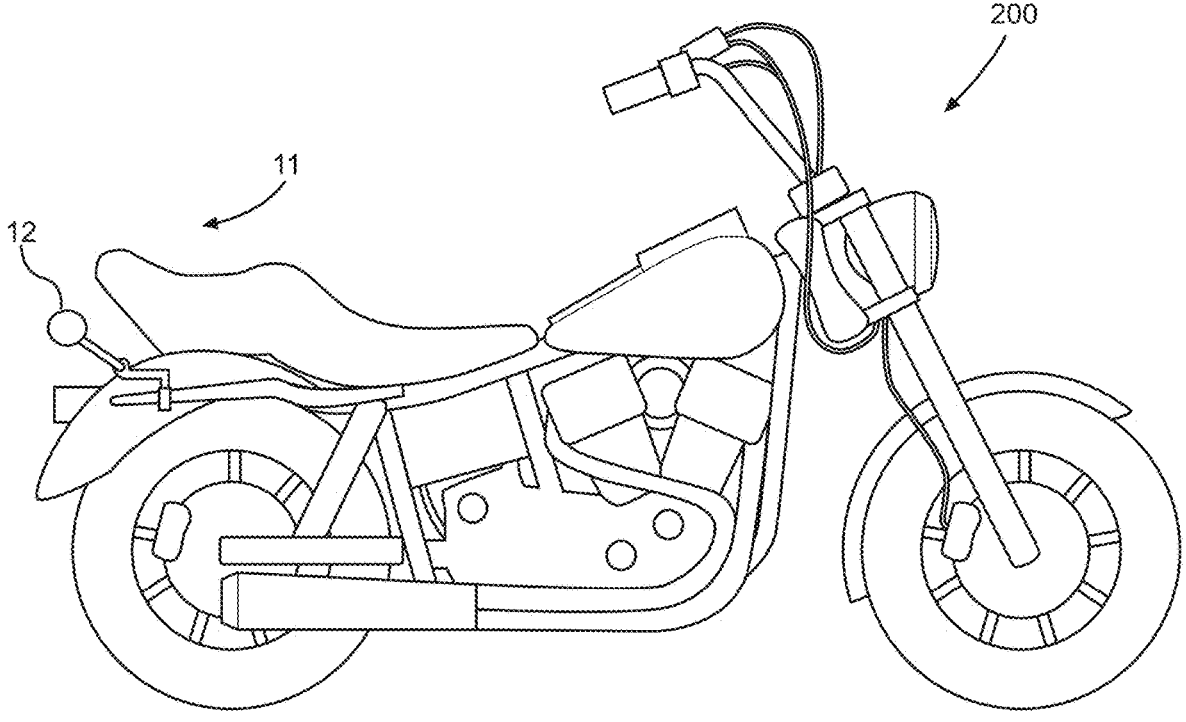
FIG. 11 shows a side view of the motorcycle canopy with the top cover in a deployed position.
Figure 12:
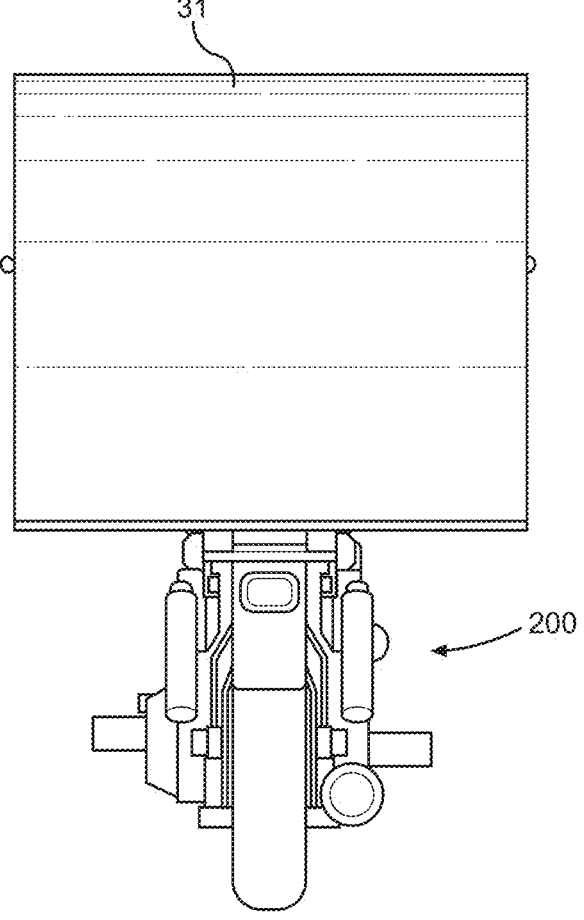
FIG. 12 shows a rear view of the motorcycle canopy with the top cover in a deployed position.
Figure 13:
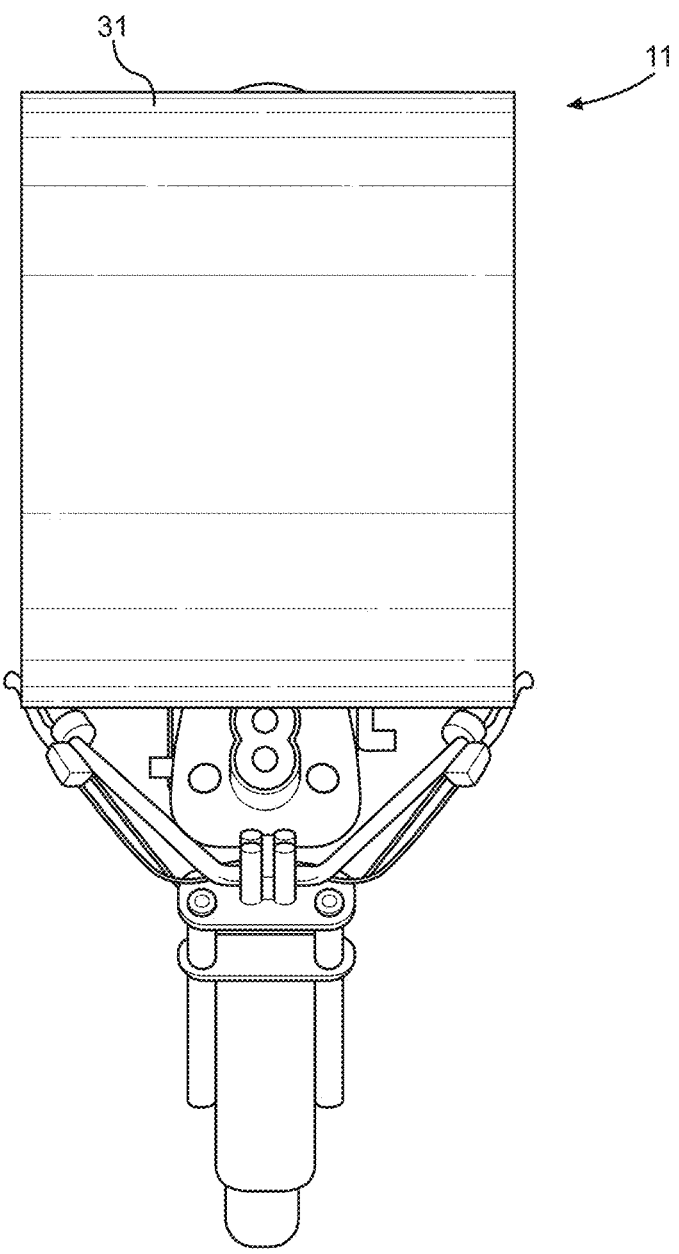
FIG. 13 shows an overhead view of the motorcycle canopy with the top cover in a deployed position.
Figure 14:
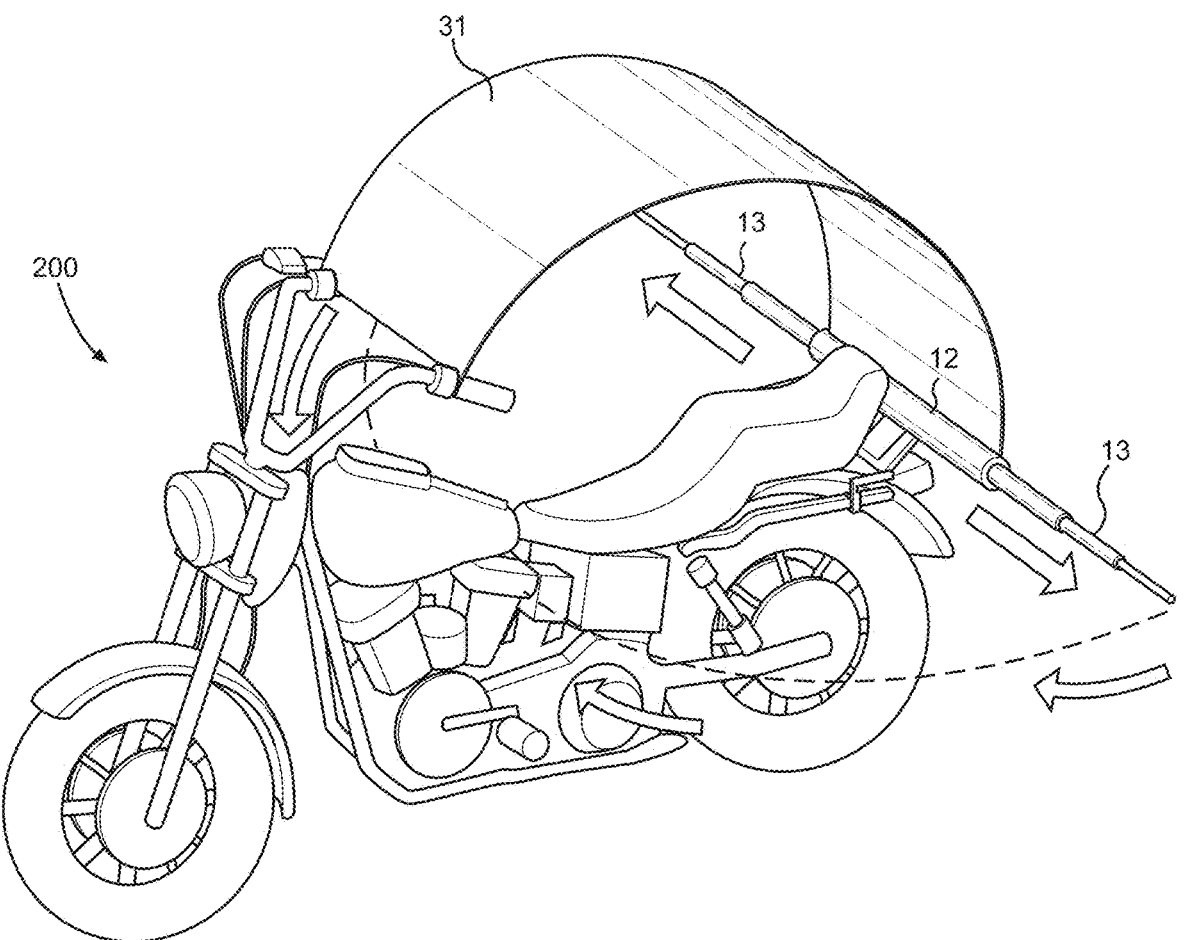
FIG. 14 shows a perspective view of the motorcycle canopy with the top cover in a deployed position and the rear bars in a parallel orientation and extended position.
Figure 15:
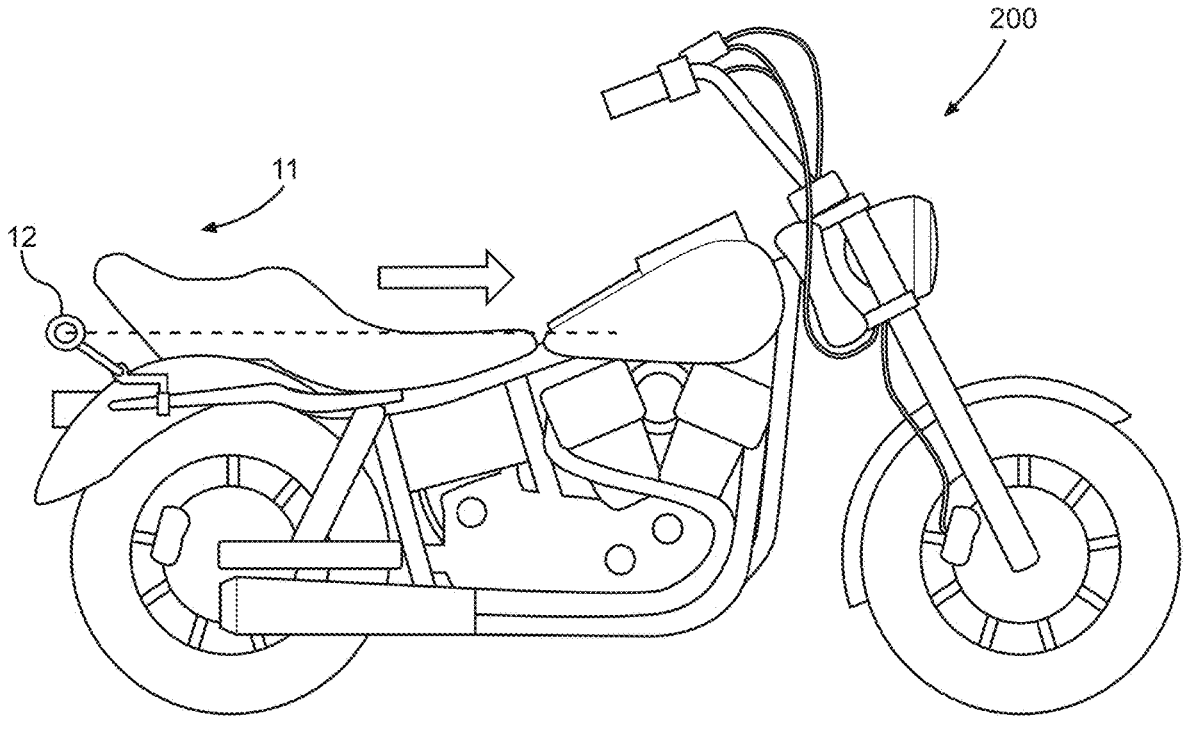
FIG. 15 shows a side view of the motorcycle canopy with the top cover in a deployed position and the rear bars in a parallel orientation and extended position.
Figure 16:
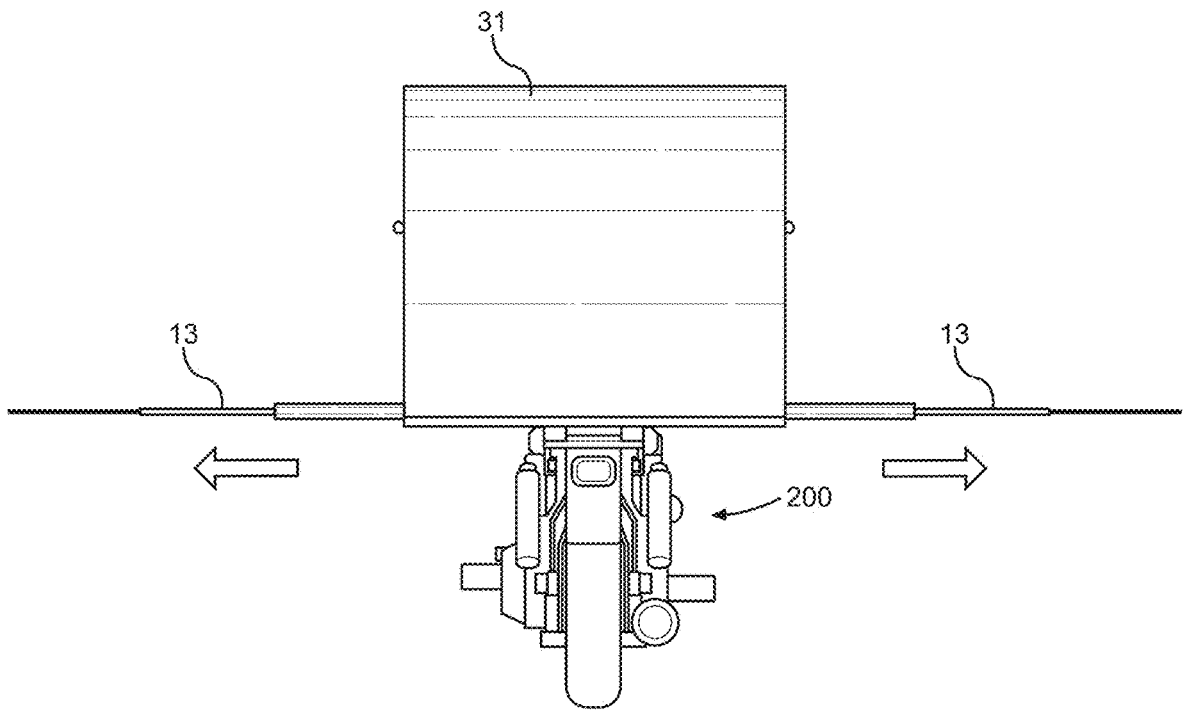
FIG. 16 shows a rear view of the motorcycle canopy with the top cover in a deployed position and the rear bars in a parallel orientation and extended position.
Figure 17:
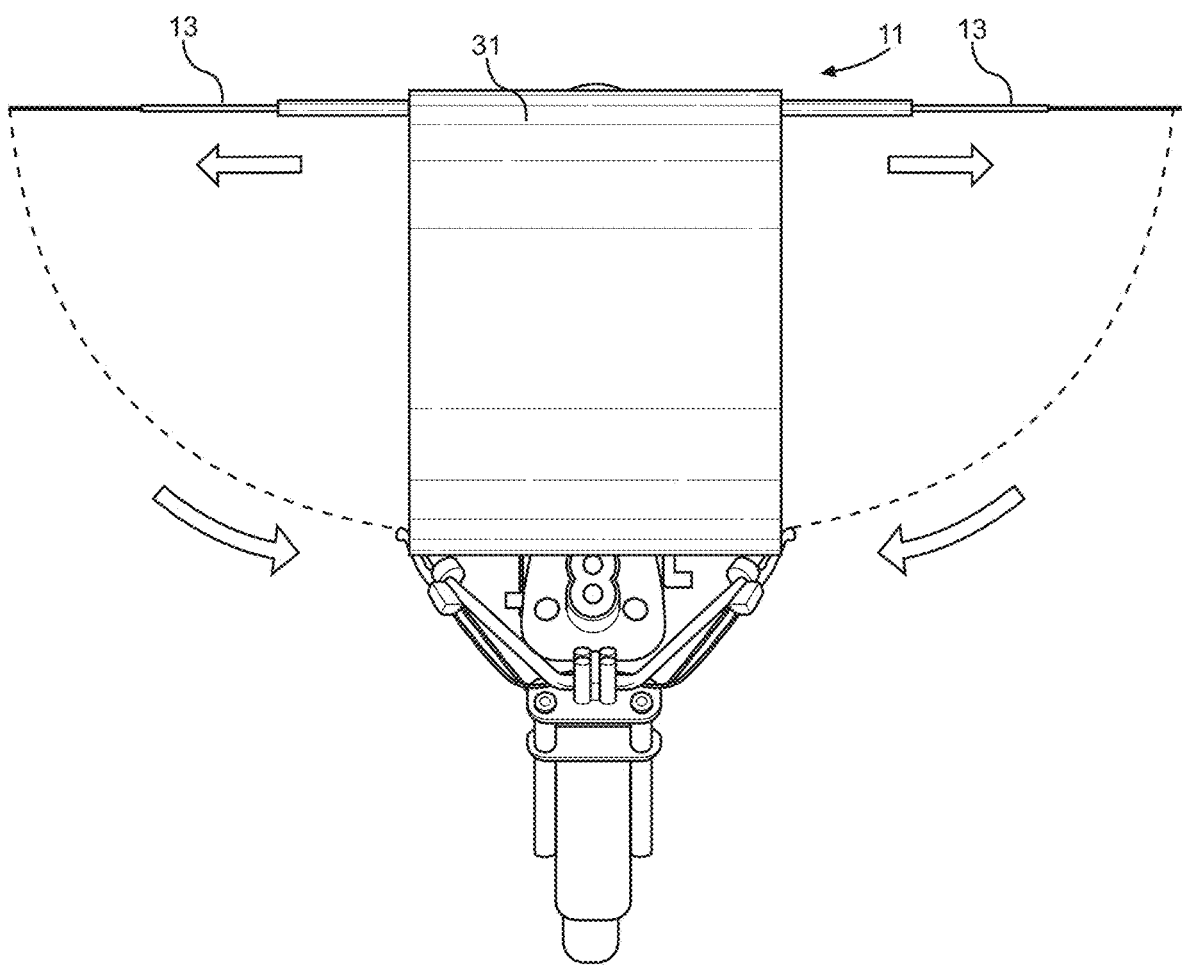
FIG. 17 shows an overhead view of the motorcycle canopy with the top cover in a deployed position and the rear bars in a parallel orientation and extended position.
Figure 18:
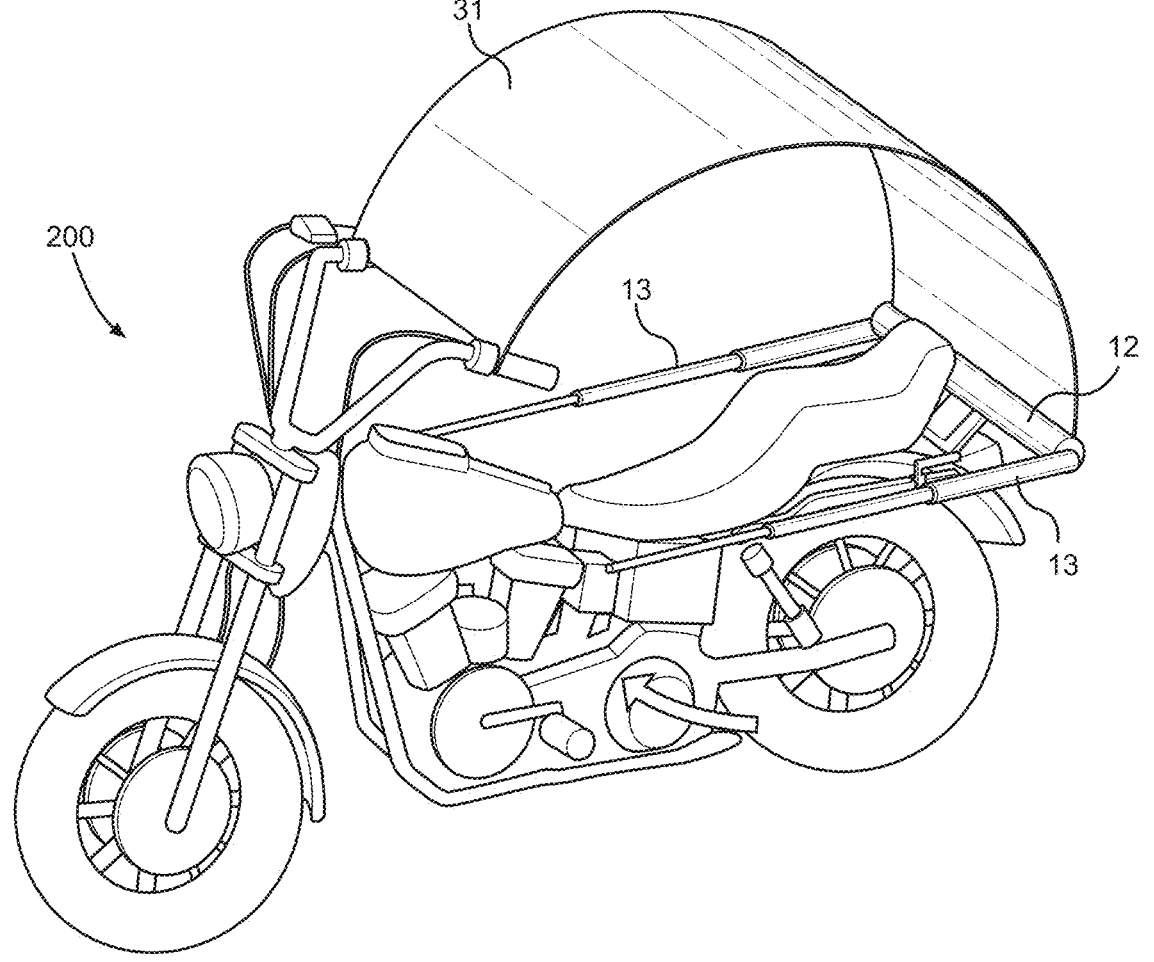
FIG. 18 shows a perspective view of the motorcycle canopy with the top cover in a deployed position and the rear bars in a perpendicular orientation and extended position.
Figure 19:
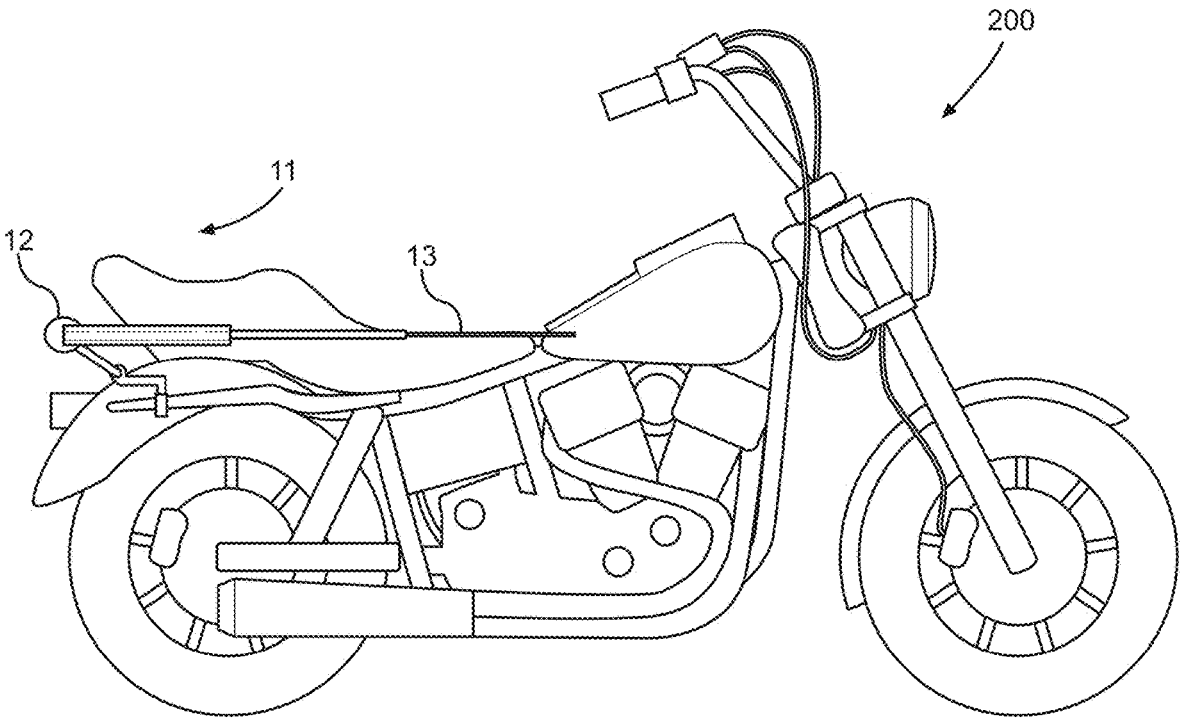
FIG. 19 shows a side view of the motorcycle canopy with the top cover in a deployed position and the rear bars in a perpendicular orientation and extended position.
Figure 20:
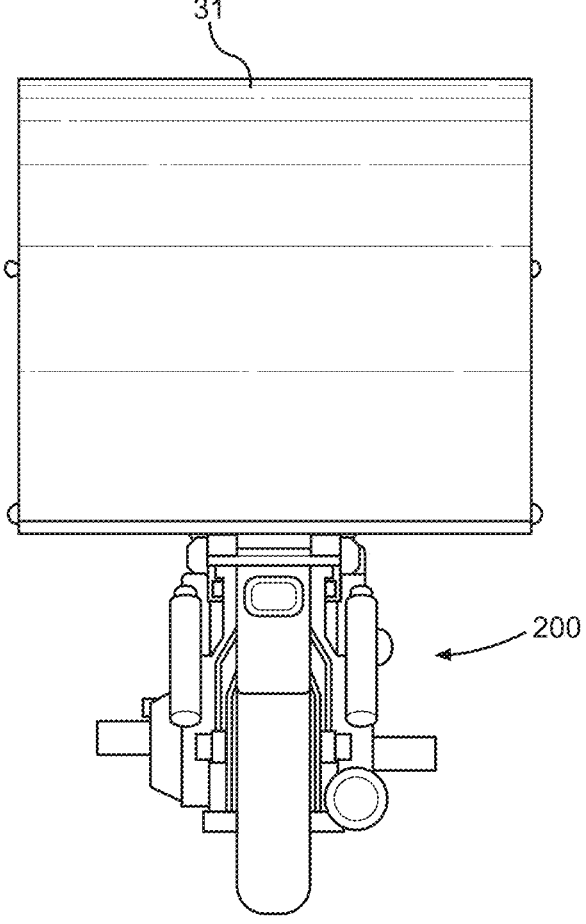
FIG. 20 shows a rear view of the motorcycle canopy with the top cover in a deployed position and the rear bars in a perpendicular orientation and extended position.
Figure 21:
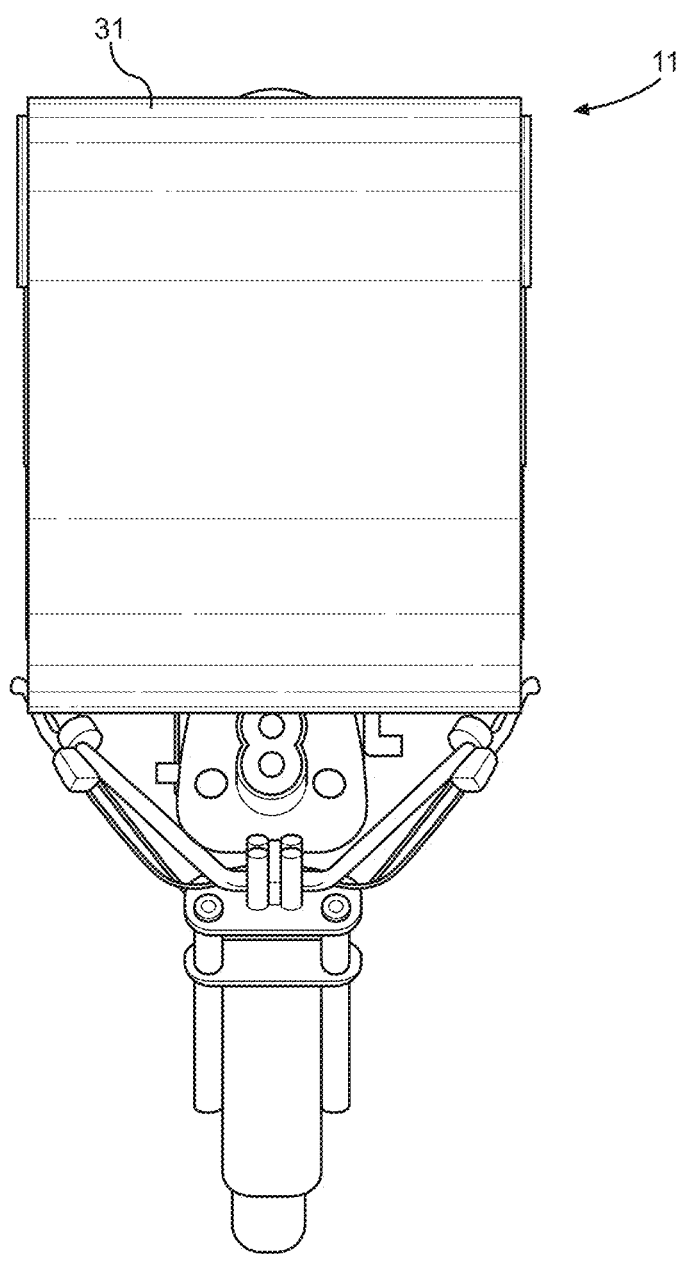
FIG. 21 shows an overhead view of the motorcycle canopy with the top cover in a deployed position and the rear bars in a perpendicular orientation and extended position.
Figure 22:
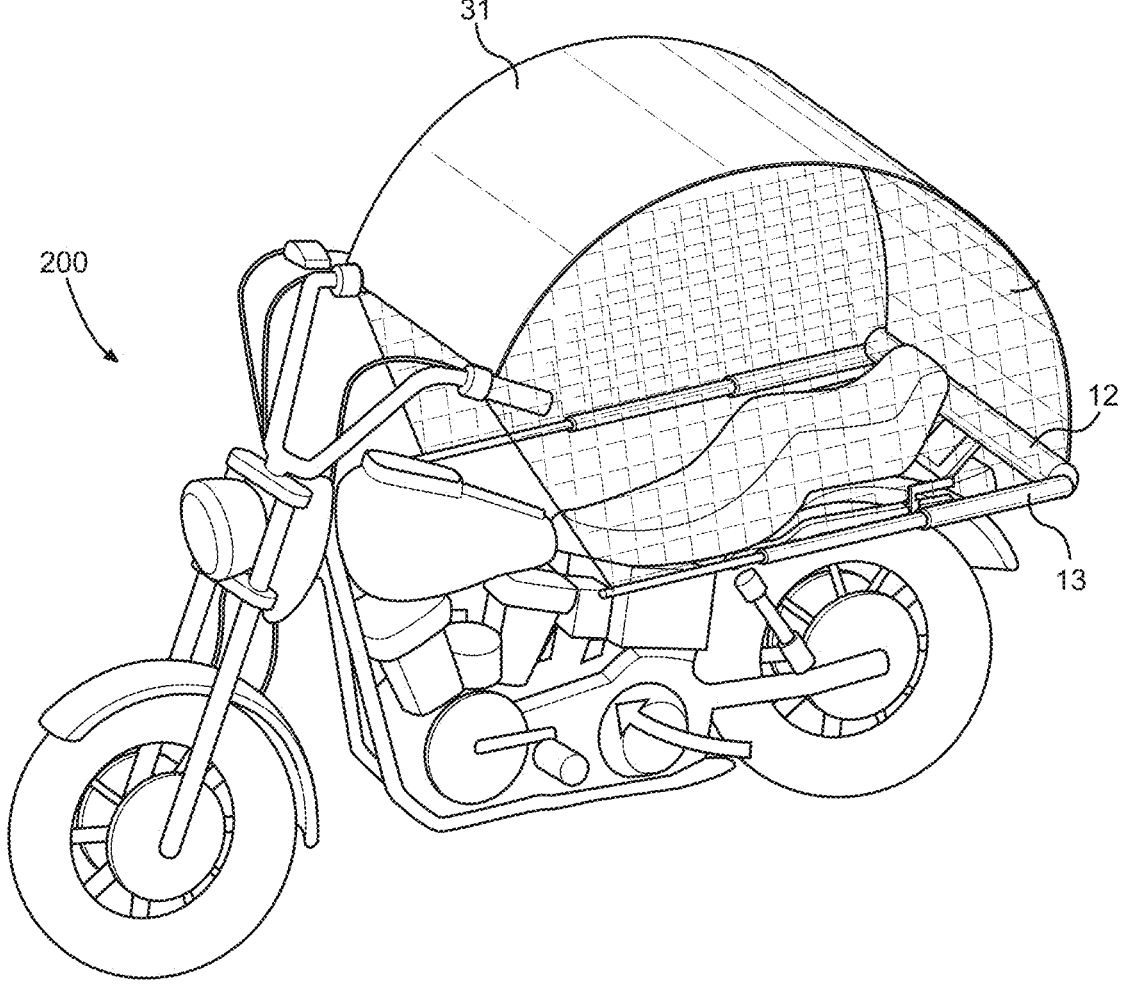
FIG. 22 shows a perspective view of the motorcycle canopy in a fully deployed configuration.
Figure 23:
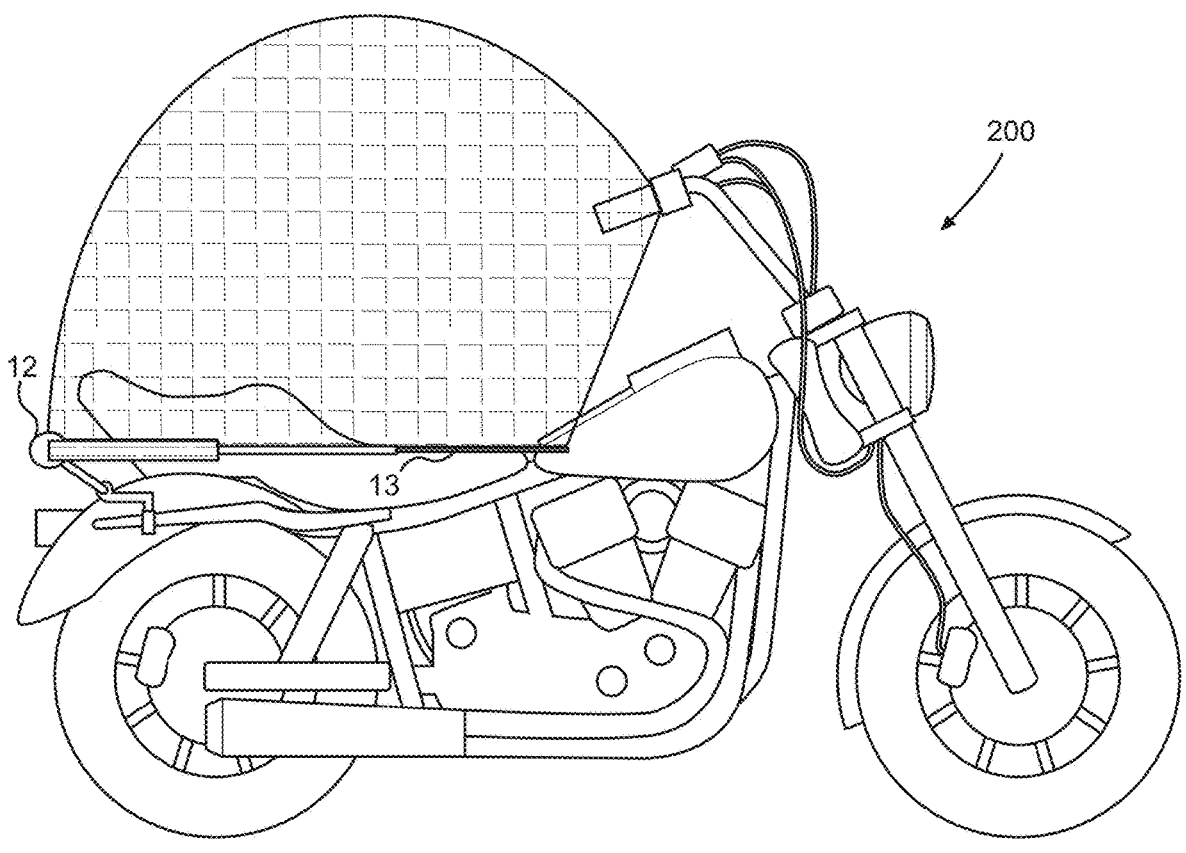
FIG. 23 shows a side view of the motorcycle canopy in a fully deployed configuration.
Figure 24:
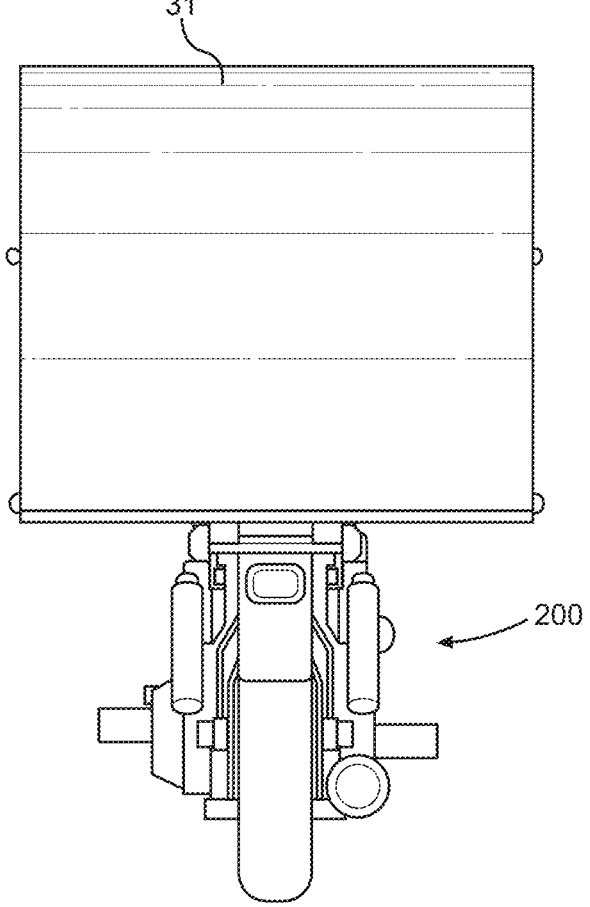
FIG. 24 shows a rear view of the motorcycle canopy in a fully deployed configuration.
Figure 25:
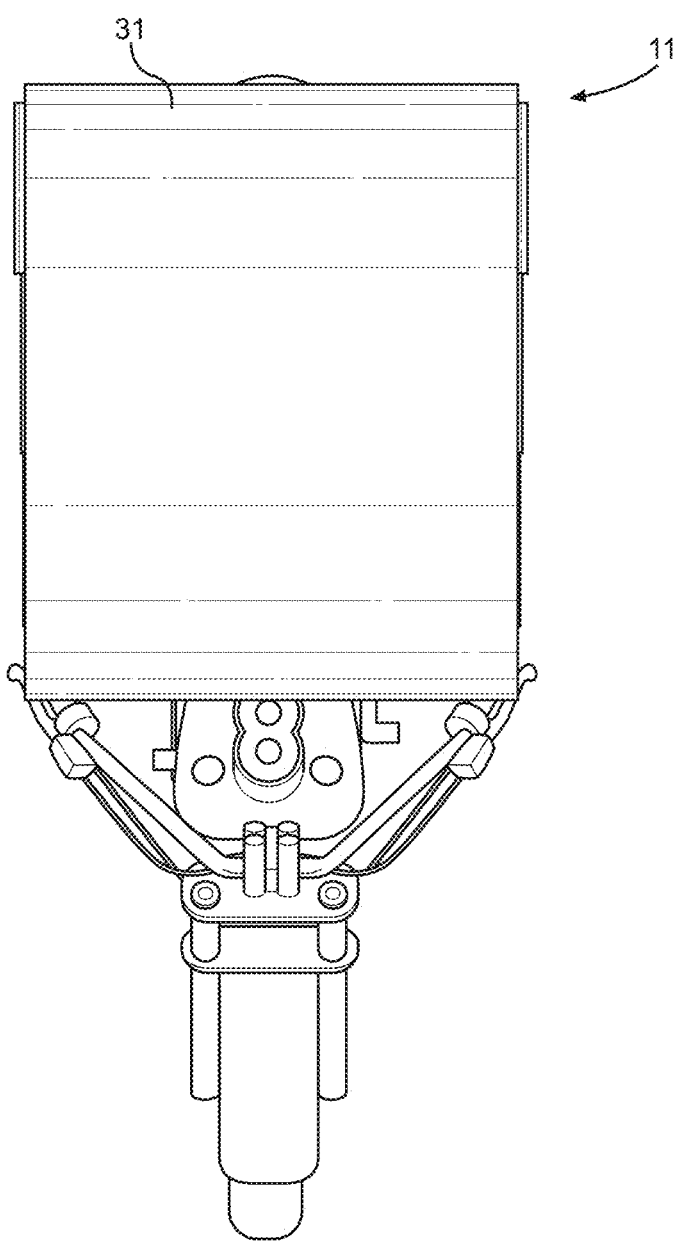
FIG. 25 shows an overhead view of the motorcycle canopy in a fully deployed configuration.

Reference is made herein to the attached drawings. Like reference numerals are used throughout the drawings to depict like or similar elements of the motorcycle canopy. For the purposes of presenting a brief and clear description of the present invention, the preferred embodiment will be discussed as used for providing a sheltered enclosure overtop a motorcycle that can cover and protect a rider from inclement weather. The figures are intended for representative purposes only and should not be considered to be limiting in any respect.

Referring now to FIG. 1, there is shown an exploded parts view of the motorcycle canopy. The motorcycle canopy 11 generally includes a main bar 12, and a pair of rear bars 13. In some embodiments, the motorcycle canopy 11 also includes a pair of front bars 16, and a plurality of crossbars, which includes a first crossbar 21, a second crossbar 22, and a third crossbar 23 in the shown embodiment. The top cover may or may not include the crossbars for stability. The canopy itself is formed by a pair of side panels 15 configured to selectively retract into or extend out of a slot on the rear bars 13, and a top cover which may include rear opaque portions 25 and a transparent front panel 24. The top cover is composed of liquid-impermeable weather resistant materials. The various components of the motorcycle canopy 11 can be secured to each other and to the motorcycle itself via any suitable fasteners. In the illustrated embodiment, the motorcycle canopy 11 is assembled and installed using thumb screws 50 and clamps 51. However, any suitable combination of installation fasteners may be utilized under the scope of the present invention. In some embodiments, the main bar 12 includes a storage compartment for storing the thumb screws 50, the clamps 51, or any other object.

The main bar 12 is configured to be secured to the rear end of a motorcycle. In the illustrated embodiment, the main bar 12 is attached to a mounting bracket 100. The bracket 100 includes a connector 102 that extends downwardly and forward from a lower portion of the main bar 12, and a pair of mounting arms 101 disposed on opposing ends of the connector 102. The bracket 100 can have alternate configurations but is always configured to secure the main bar 12 to the rear end of the motorcycle.

When the motorcycle canopy 11 is not in use, the components of the motorcycle canopy 11 can be moved to various storage positions. For example, in the illustrated embodiment, the rear bars 13 are configured to maintain a horizontal stored position when attached to the main bar 12 or the crossbars. Any variety or combination of fasteners may be utilized to secure the motorcycle canopy 11 components in their respective non-use positions. In this way, the entire motorcycle canopy 11 can maintain a compact configuration, such that all of the components can be easily secured to the rear end of the motorcycle and quickly accessed when the user deploys the motorcycle canopy 11.

Referring now to FIGS. 2-5, there are shown multiple views of the motorcycle canopy in a stored configuration. The rear bars 13 are configured to rotate between a perpendicular orientation with respect to the main bar 12 and a parallel orientation with respect to the main bar 12. The rear bars 13 are pivotally affixed to above the main bar 12, which forms a base for securing the motorcycle canopy 11 to the motorcycle. The main bar 12 is secured to the rear end 201 of the motorcycle 200 in the shown embodiment. The main bar 12 can be secured to the fender, frame, or any other suitable connection point on the rear end 201 of the motorcycle 200.

Referring now to FIGS. 6-9, there are shown multiple views of the pivoting rear bar component of the motorcycle canopy. In the shown embodiment, the rear bars 13 are pivotally affixed to the main bar 12, such that the rear bars 13 can rotate between a perpendicular non-use position and a parallel in-use position, wherein the rear bars 13 extend from a rear end 201 of the motorcycle 200. In some embodiments, the pivotal connection includes a locking mechanism configured to lock the rear bars 13 in the desired orientation. In some embodiments, the rear bars 13 are further configured to be telescopically adjustable in length, in order to accommodate different types and sizes of riders or motorcycles.

Referring now to FIGS. 10-13, there are shown multiple views of the side panel and front bar components of the motorcycle canopy. The top cover 31 is configured to extend upwardly and forwardly out of the main bar 12 and secure to the handlebars of the motorcycle 200 via any suitable fastener. In the shown embodiment, the top cover 31 is configured to maintain an arcuate profile when in the deployed position, in order to provide headroom for the rider. The top cover 31 can include external or internal supports for maintaining the arcuate profile, or may be flexible and resiliently formed to maintain such shape. The top cover 31 and side panels (not visible) are composed of weatherproof, water impermeable materials and are at least partially transparent to allow the rider to see while riding.

Referring now to FIGS. 14-17, there are shown a perspective view of the motorcycle canopy with the top cover in a deployed position and the rear bars in a parallel orientation and extended position. In the illustrated embodiment, the rear bars 13 are telescopic in configuration, meaning they can be extended toward the front end of the motorcycle when they are pivoted to the perpendicular orientation with respect to the main bar 12. The rear bars 13 can be extended or retracted when in either the parallel or perpendicular orientation, which allows the motorcycle canopy 11 to be adjusted for particularly sized riders or motorcycles.

Referring now to FIGS. 18-21, there are shown multiple perspective views of the motorcycle canopy with the top cover in a deployed position and the rear bars in a perpendicular orientation and extended position. The rear bars 13 can be pivoted toward and secured to the front end of the motorcycle 200 via the use of any suitable fasteners. The side panels are stored within the rear bars until needed for use. The device can operate with the top cover deployed and the side panels retracted, or vice versa, in order to provide a customized enclosure depending on the conditions and the preferences of the rider.

Referring now to FIGS. 22-25, there are shown multiple views of the motorcycle canopy in a fully deployed configuration. The side panel connects to a lower edge of the top cover 31. The front end of the side panel can be secured to the handlebars of the motorcycle 200 via any suitable fasteners. Further, the rear bars 13 can include a front end that secures to a bracket on the front end of the motorcycle for added stability. In operation, the main and rear bars can be moved to the proper position and side or upper covers depending on how the rider wishes to cover themselves. In this way, the motorcycle canopy can be maintained in a compact stored position and then selectively deployed in a variety of configurations in order to provide protection from inclement weather for the rider.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle canopy, consisting of:

a main bar configured to be attached to a rear end of a motorcycle in a direction transverse to the direction of travel of the motorcycle, the main bar having an interior storage space configured to store a plurality of fasteners therein, the main bar including a bracket having a pair of arms that are configured to secure to the rear end of the motorcycle via the plurality of fasteners;

a pair of retractable folding rear bars pivotally attached at opposing ends of the main bar and pivotable between a parallel position and a perpendicular position with respect to the orientation of the main bar, each rear bar further including a transparent retractable plastic side panel contained therein, the side panels being extendable from the pair of rear bars toward a front end of the motorcycle, wherein the pair of rear bars are securable to the main bar when not in use;

a top cover attached to the main bar and selectively extendable upwardly and forwardly over a seating area of the motorcycle in an arcuate configuration; wherein, when in the extended position, the top cover defines a partially enclosed interior when the rear bars are in a deployed position and the top cover is extended from a rear portion of the motorcycle overtop the seat portion of the motorcycle to the handlebars.

2. A motorcycle canopy, consisting of:

a main bar configured to be secured to a rear portion of a motorcycle; wherein the main bar includes an attachment bracket, wherein the attachment bracket includes a connector attached to a lower end of the main bar and a pair of arms attached to the connector, the pair of arms configured to secure to the motorcycle; wherein the main bar further includes an interior storage space configured to store a plurality of fasteners therein;

a pair of rear bars pivotally affixed to the main bar, the pair of rear bars configured to rotate between a parallel orientation and a perpendicular orientation with respect to the main bar; wherein the rear bars are configured to telescopically move between an extended configuration and a retracted configuration;

a side panel disposed within an interior portion of each rear bar, wherein each side panel is configured to move between a retracted position within the rear bar and an extended position extending upwardly from each rear bar; wherein the pair of side panels are at least partially transparent; wherein a front edge of each side panel is configured to be removeably secured to the handlebar of the motorcycle;

a top cover attachable to the main bar, the top cover configured to removably secure to a handlebar of the motorcycle when the top cover is in a deployed configuration; wherein the top cover is composed of liquid-impermeable weather resistant materials; and further wherein the top cover includes a rear opaque portion and a front transparent portion.

\* \* \* \* \*